United States Patent [19]

Gust et al.

[11] Patent Number: 4,533,509

[45] Date of Patent: Aug. 6, 1985

[54] LOW COEFFICIENT OF FRICTION FILM STRUCTURE AND METHOD OF FORMING THE SAME

[75] Inventors: Lawrence J. Gust, Victor; Eileen F. O'Sullivan, Rochester; Ronald C. Wood, Jr., Fairport, all of N.Y.

[73] Assignee: Mobil Oil Corporation, New York, N.Y.

[21] Appl. No.: 489,425

[22] Filed: Apr. 28, 1983

[51] Int. Cl.³ ............................................... B29D 7/24
[52] U.S. Cl. ................................. 264/171; 264/210.6; 264/211; 524/492; 524/493
[58] Field of Search ............... 264/171, 211, 210.6; 524/492–493

[56] References Cited

U.S. PATENT DOCUMENTS

| | | | |
|---|---|---|---|
| 3,645,822 | 2/1972 | Widiger et al. | 156/243 |
| 3,658,980 | 4/1972 | Caiola et al. | 264/210.6 |
| 3,809,671 | 5/1974 | Okawa et al. | 264/211 |
| 4,118,438 | 10/1978 | Matsui et al. | 264/211 |
| 4,327,009 | 4/1982 | Allen et al. | 264/210.6 |
| 4,394,474 | 7/1983 | McKinney et al. | 264/210.6 |
| 4,412,025 | 10/1983 | Corwin et al. | 264/211 |
| 4,430,289 | 2/1984 | McKinney et al. | 264/210.6 |

FOREIGN PATENT DOCUMENTS

| | | | |
|---|---|---|---|
| 45-27712 | 9/1970 | Japan | 264/211 |
| 50-16744 | 2/1975 | Japan | 264/210.6 |
| 51-69574 | 6/1976 | Japan | 264/171 |
| 56-30855 | 3/1981 | Japan | 264/171 |
| 57-43835 | 3/1982 | Japan | 264/211 |

*Primary Examiner*—Jeffery Thurlow
*Attorney, Agent, or Firm*—Alexander J. McKillop; Michael G. Gilman; Edward J. Trojnar

[57] ABSTRACT

The invention relates to a composite oriented structure having at least one thin surface layer containing highly subdivided inorganic material in an antiblock and coefficient of friction reducing proportion, said thin layer being formed simultaneously or sequentially on a comparatively thick base layer and thereafter oriented and the method of preparing the multilayer structure.

11 Claims, No Drawings

LOW COEFFICIENT OF FRICTION FILM STRUCTURE AND METHOD OF FORMING THE SAME

The present invention relates to a transparent oriented multilayer film structure having a low haze percentage, excellent slip and non-blocking properties and the preparation of such a film structure.

Polypropylene films are widely used in the packaging industry due to their physical properties, such as, transparency, stiffness and excellent moisture barrier. With all its good characteristics, unmodified polypropylene film also has the disadvantageous properties of high inherent coefficient of friction and film to film destructive blocking on storage. In the past, coefficient of friction characteristics of polypropylene and other thermoplastic films have been beneficially modified by the inclusion in the polymer of fatty acid amides. The effectiveness of the amides relies upon their ability to migrate to the surface of the films in order to reduce coefficient of friction. While such amides do improve the coefficeint of friction of the films, the value of the coefficient of friction is subject to wide variation depending upon the heat history which the film exeriences during shipping, storage, and certain converting processes. The presence of such amides on the film surfaces can adversely affect the film's appearance as manifested by an increase in haze, a decrease in gloss and the presence of streaks. The presence of such amides on the surface can also adversely affect the wettability and adhesion of solvent and water based inks, coatings and adhesives.

It is an object of the present invention to provide a film having a reduced coefficient of friction as compared with the unmodified film.

It is another object of the present invention to present a film which has better non-blocking characteristics in comparison with the unmodified film.

It is yet another object of the present invention to provide a film having non-blocking and improved slip characteristics which are stable with regard to the heat history experienced.

It is an object of the present invention to provide a film having non-blocking and improved slip characteristics without the adverse effects on appearance, wetting and adhesion typically experienced with amide-modified films.

SUMMARY OF THE INVENTION

According to the present invention, it has been discovered that fatty acid amide type coefficient of friction improvers can be completely excluded from the contemplated film structures of the present invention.

According to the present invention, there is provided a transparent oriented multi-layer film structure having a haze percentage of less than about 3 comprising;

(a) a comparatively thick base layer of an optically clear thermoplastic resin;

(b) a comparatively thin surface layer on at least one surface of layer (a), said surface layer comprising an optically clear thermosplastic resin containing uniformly dispersed therein a finely divided inorganic material in a proportion sufficient to thereby impart antiblock characteristics and decrease film to film coefficient of friction of the resulting layer in oriented form; said structure being biaxially oriented so that the thickness of said surface layer and the proportion of said inorganic material in said surface layer is such that the percent haze of the oriented multilayer structure is about 3 or less.

It is preferred that the inorganic material have a mean particle size of from about 0.2 to 5.0 microns. It also is preferred that the film to film coefficient of friction of the structure is about 0.4 or less. It is further preferred that the inorganic material be a member selected from the group consisting of a silica, an aluminum-silicate; a sodium-aluminum silicate; a carbon black; an mixtures thereof. When a mixture is employed, any combination of proportions can be utilized.

The method of preparing the subject thermoplastic film structure comprises;

(a) preparing a skin resin of a finely divided, uniformly dispersed inorganic material in an optically clear thermoplastic resin, either in one step or by first preparing a concentrate of said inorganic material in said resin and diluting the concentrate with additional thermoplastic resin so that the proportion of inorganic material in the skin resin is sufficient to impart antiblock characteristics and decrease the inherent film to film coefficient of friction of an oriented film of said thermoplastic resin to about 0.4 or less;

(b) forming either simultaneously or sequentially a composite of a comparatively thin surface layer of the composition of (a) on at least one surface of a comparatively thick base layer of an optically clear thermoplastic layer; and (c) orienting the composite so that the thickness of said surface layer and the proportion of said inorganic material in said surface layer is such that the percent haze of the composite is about 3 or less.

DETAILED DESCRIPTION OF THE INVENTION

The inclusion of a small percentage of finely subdivided inorganic material in the skin layer of a composite polymer film structure not only can impart antiblock characteristics to the structure, but also can reduce the coefficient of friction of polymer films in general without imparting objectionable haze to the structure. The invention will be illustrated with respect to the improvement in polypropylene films as representative of high COF films which tend to destructively block. The polypropylene films contemplated are commercially available films which may or may not have incorporated therein certain additives calculated to protect the polymer against the adverse effects of light energy and excess heat, e.g., ultra violet light absorbers and antioxidents.

Contemplated finely divided inorganic materials referred to above include, Syloid, a synthetic amorphous silica gel, having a composition of 99.7% $SiO_2$, diatomaceous earth having a composition of, for example, $SiO_2$ 92%, $Al_2O_3$ 3.3%, $Fe_2O_3$ 1.2%, which has an average particle size of about 5.5 microns, which particles are porous and irregularly shaped; dehydrated kaolinite (Kaopolite SF) having the composition $SiO_2$ 55%, $Al_2O_3$ 44%, $Fe_2O_3$ 0.4%, which has an average particle size of about 0.7 microns which particles are thin flat platelets; and synethetic precipitated silicates (Sipernat 44), for example, having a composition of $SiO_2$ 42%, $Al_2O_3$ 36%, $Na_2O$ 22%, which has an average particle size of about 3-4 microns which the particles are porous and irregularly shaped.

The skin resins for the structures contemplated herein are formed by employing a commercially available intensive mixer, e.g. of the Bolling or Banbury-type. Mixers or this type are to be employed in mixing a concentrate of the finely divided inorganic material and the selected optically clear polymer until there is a uniform dispersion of the inorganic material in the polymer.

The skin layer or layers can range in thickness from the thinnest continuous layer or layers possible to about 10% each of the overall thickness of the finished film composite.

The following examples will illustrate the technique of forming the film structures of the present invention.

Coefficient of friction values referred to herein are determined according to the procedure of ASTM D 1894-78, modified as follows: the film to film area of contact is 2 inches×1 inch, instead of 2½ inches×2½ inches. The mass of the sled is 100 grams rather than 200 grams and the sled speed is 6 inches per minute, the same as ASTM D 1894-78. Thus, the modified test is run at the condition of 50 grams/in.² rather than 32 grams/in.².

Haze and gloss values referred to herein are determined according to the procedures of ASTM D 1003-61 and D 2457-70 respectively.

EXAMPLE 1

A concentrate containing 90% by weight of a 4.5 Melt Flow homopolymer polypropylene and 10% by weight of Sipernat 44, a precipitated sodium-aluminum silicate of the following analysis, $SiO_2$ 42%, $Al_2O_3$ 36%, $Na_2O$ 22%, having a 3.5 micron mean particle size, available from Degussa Chemical Company; is intimately melt-mixed in a Bolling mixer until the inorganic components are uniformly dispersed in the molten polypropylene. The melt concentrate is fed into a pelletizing extruder line and formed into a solid pellet concentrate.

A second concentrate containing 90% by weight of a 4.5 Melt Flow homopolymer polypropylene and 10% by weight Kaopolite SF, a dehydrated Kaolinite of the following analysis $SiO_2$ 55%, $Al_2O_3$ 44%, $Fe_2O_3$ 0.4%, having a 0.7 micron mean particle size is prepared in the same manner and also pelletized. The two pelletized concentrates are then melt-blended with additional polypropylene of 4.5 Melt Flow, and after uniform mixing, the blend is formed into solid pellets. The composition is now 99.1% polypropylene, 0.4% Sipernat 44 and 0.5% by weight Kaopolite SF.

A three-layer film structure is formed by feeding the above-described composition into a satellite extruder that feeds the two outer layers of a three-layer slot die. Polypropylene core layer resin is fed into the main extruder that feeds the center (core) layer of the same die and a three layer molten sheet is cast from the die onto a cooling drum and quenched to a temperature between about 30°–50° C. The sheet measures about 25 mils thick and is composed of top and bottom layers which are approximately 2.5% each of the overall structure thickness. The sheet is thereafter reheated to a temperature between about 150°–175° C. and stretched 500–600% in the machine direction, then 600–700% in the transverse direction on a commercially available center orienting apparatus. The finished film is about 0.75 mil thick and has the following characteristics:
COF—approximately 0.30
Haze—approximately 2.5%
Gloss—approximately 90.0%
No blocking of slit rolls after three days at 60° C.

The coefficient of friction of the finished film not only is desirably low but also is stable over condition simulating typical converting operations involving temperatures reaching as high as 80° C. for 3 seconds. The percent haze and gloss is considered to be remarkably good considering the excellent coefficient of friction and anti-block characteristics of the structure.

EXAMPLE 2

The structure of Example 1 is corona discharge treated on both sides thereof in order to improve wettability and adhesion by inks or other surface layers which may tend to have inferior wetting and adhesion in the absence of corona treatment. The finished film has the following characteristics:
COF—approximately 0.3
Haze—approximately 0.24%
Gloss—approximately 90%
No blocking of slit rolls after 3 days at 60° C.

This structure illustrates two significant advantages of this invention. For the same corona energy density, film from Example 1 will attain a higher surface energy than a fatty acid amide-modified homopolymer polypropylene film. This represents a significant improvement in wetting and adhesion and in production rates.

The second advantage is that the coefficient of friction of the surface of the film from Example 1 is unaffected by corona discharge treatment whereas amide-modified polypropylene films significantly increase in coefficient of friction upon such treatment and must thereafter be conditioned to restore the coefficient of friction to useable levels.

EXAMPLE 3

For comparison purposes a 0.75 mil structure is formed in the same manner as Example 2 except that the same 4.5 Melt Flow polypropylene is employed in the skin layers and in the core layer and no inorganic material is present in the skin layer. This film structure is corona discharge treated on both sides. This structure has the following characteristics:
COF—greater than 0.60
Haze—less than 1.0%
Gloss—90–95%
Slit roll could not be unwound after three days at 60° C.

This illustrates the remarkable difference in the two film structures based upon coefficient of friction and antiblock characteristics. The structures of the present invention are vastly improved in these respects without any meaningful sacrifice in film appearance.

EXAMPLE 4

For comparative purpose a 0.75 mil structure is formed in the same manner as in Example 2 except that the same resin, a blend containing 99.1% of a 4.5 Melt Flow polypropylene plus 0.5% Kaopolite SF plus 0.4% of Sipernat 44 is employed both in the skin and core layers. This structure has the following characteristics:
COF—approximately 0.3
Haze—approximately 21.3%
Gloss—approximately 81%
This structure will have no destructive blocking after 3 days at 60° C.

This illustrates the remarkable difference in the two film structures based upon appearance. The structure of the present invention is vastly improved in this respect without any sacrifice in coefficient of friction or antiblock characteristics.

EXAMPLE 5

The process of Example 1 is repeated except the skin resin contains 99.5% polypropylene, 0.1% Sipernat 44 and 0.4% Kaopolite SF. The base sheet formed from the coextrusion measures approximately 25 mils thick and the skin resins measure approximately 5% each of the overall film structure thickness. After biaxial orientation, the finished film is 0.75 mil thick. The finished film is thereafter corona discharged treated on both sides thereof. This film has the following characteristics.

COF—approximately 0.30
Haze—approximately 1.7%
Gloss—approximately 90.0%
No blocking of slit rolls after three days at 60° C.

EXAMPLE 6

Employing the process of Example 1, a master batch is prepared utilizing 90% of the 4.5 melt index homopolymer polypropylene and 10% Zeeospheres, a silica-alumina ceramic particulate material in spherical form, supplied by Zeelan Industries. This material has a mean particle size of about 4 microns. After uniform mixing, the master batch is diluted with sufficient polypropylene to yield a skin resin composition having 1% of Zeeospheres and 99% of the polypropylene. A three layer structure is formed wherein the skin layers are approximately 10% of the overall thickness of the structure. The base sheet measures 25 mils prior to biaxial orientation and thereafter a 0.75 mil thick film is formed. Both sides of this film are corona discharge treated. The structure has the following characteristics:

COF—approximately 0.25
Haze—approximately 2.4%
Gloss—approximately 94.3%

EXAMPLE 7

Employing the process of Example 1, a master batch is prepared containing 90% homopolymer, 4.5 melt index, polypropylene and 10% by weight Sipernat 44. After uniform dispersion a skin resin formulation is prepared by diluting the master batch with additional polypropylene so that the final composition contains 99.5% polypropylene and 0.5% by weight Sipernat 44. A three layer structure approximately 25 mils thick is formed having outer skins each approximately 5% of the overall thickness of the structure. After biaxial orientation, the film measures 0.75 mil thick. This film is corona discharge treated on both sides. The resulting film has the following characteristics:

COF—approximately 0.30
Haze—approximately 2.7%
Gloss—approximately 93%

It is to be understood that other specific polymers and copolymers are contemplated for use herein in place of the polypropylene, for example, an ethylene-propylene copolymer containing up to approximately 4% ethylene, a low density polyethylene, a linear low density polyethylene copolymerized with another alpha-olefin, or polyethylene terephthalate can be employed. It is also to be understood that in formulating the structures contemplated a certain percentage of recycle material can be employed both in the core layer or in the skin layer of the structure. The amount of recycle material should be such that it constitutes a minor proportion of the polymer employed, for example, up to about 25% by weight thereof. As employed herein the phrase "optically clear thermoplastic resin" includes those having a haze percentage of less than about 2 in a 1 mil film. This will permit the employment of recycle material in the resin of the structure which recycle may include a small percentage of inorganic particulate material.

The film structures of the present invention have wide utility as a wrapping material, alone or in combination with other coating layers or films. They are characterized by having coefficient of friction stability during temperature changes encountered in preconversion storage during conversion wrapping processing and during transportation. They have excellent adhesive wetting and bond strengths; and good cold seal wettability, etc.

In the formation of the multilayer structures of the present invention the composite can be formed either by coextrusion of base and skin layers or extrusion of the skin layer or layers on a previously formed base or by lamination of separately formed skin and base layers, in all cases followed by orientation.

What is claimed is:
1. A method of preparing a thermoplastic film structure free of organic coefficient of friction reducing agents comprising:
 (a) preparing a skin resin of a finely divided, uniformly dispersed inorganic material in an optically clear thermoplastic resin, either in one step or by first preparing a concentrate of said inorganic material in said resin and diluting the concentrate with additional thermoplastic resin so that the proportion of inorganic material in the skin resin is sufficient to impart antiblock characteristics and decrease the inherent film to film coefficient of friction of an oriented film of said thermoplastic resin to about 0.4 or less;
 (b) forming either simultaneously or sequentially a composite of a comparatively thin surface layer of the composition of (a) on at least one surface of a comparatively thick base layer of optically clear thermoplastic free of inorganic antiblock agents, and
 (c) orienting the composite so that the thickness of said surface layer and the proportion of said inorganic material in said surface layer is such that the % haze of the oriented composite is about 3 or less.

2. The method of claim 1 wherein the inorganic material has a mean particle size of from about 0.2 to about 5.0 microns.

3. The method of claim 2 wherein the thermoplastic resin of the base layer and the surface layer are different.

4. The method of claim 2 wherein the thermoplastic resin of the base layer and the surface layer are the same.

5. The method of claim 4 wherein the thermoplastic resin is polypropylene.

6. The method of claim 5 wherein the inorganic material is a member selected from the group consisting of an aluminum silicate; and mixtures thereof 7. The method of claim 6 wherein the surface layer of the oriented structure is in a thickness ranging from the thinnest continuous film possible to about 10% of the thickness of the overall structure.

8. The method of claim 7 wherein said inorganic material in a sodium-aluminum silicate.

9. The method of claim 7 wherein said inorganic material is a mixture of a sodium-aluminum silicate and an aluminum silicate 10. The method of claim 9 wherein said inorganic material is a mixture of dehydrated kaolinite and a sodium-aluminum silicate.

11. The method of claim 7 wherein the inorganic material is a silica-alumina ceramic particulate material in spherical form.

* * * * *